United States Patent [19]

Ingram

[11] 4,256,339
[45] Mar. 17, 1981

[54] VELOCITY RESPONSIVE DEFLECTOR BLADE WITH SELF-ALIGNMENT PIVOTAL MOUNTING

[75] Inventor: Charles E. Ingram, Warren, Mich.

[73] Assignee: Four Star Corporation, Troy, Mich.

[21] Appl. No.: 33,048

[22] Filed: Apr. 25, 1979

Related U.S. Application Data

[63] Continuation-in-part of Ser. No. 848,402, Nov. 4, 1977, Pat. No. 4,179,154, and Ser. No. 884,009, Mar. 6, 1978, Pat. No. 4,170,377.

[51] Int. Cl.³ ............................................. B62D 37/02
[52] U.S. Cl. ..................................................... 296/1 S
[58] Field of Search ...................... 296/1 S, 91; 52/84; 224/42.1

[56] References Cited

U.S. PATENT DOCUMENTS

| 3,089,728 | 5/1963 | Shumaker | 296/1 S X |
| 4,170,377 | 10/1979 | Ingram | 296/15 |

Primary Examiner—John J. Love
Assistant Examiner—Norman L. Stack
Attorney, Agent, or Firm—Reising, Ethington, Barnard, Perry & Brooks

[57] ABSTRACT

An air deflector blade for vehicles and the like is pivotally movable between a substantially vertical orientation and a substantially horizontal orientation in response to the wind velocity created thereupon. The pivotal mounting enables the blade to rotate selectively between the vertical and horizontal positions in proportion to the speed of the vehicle.

7 Claims, 11 Drawing Figures

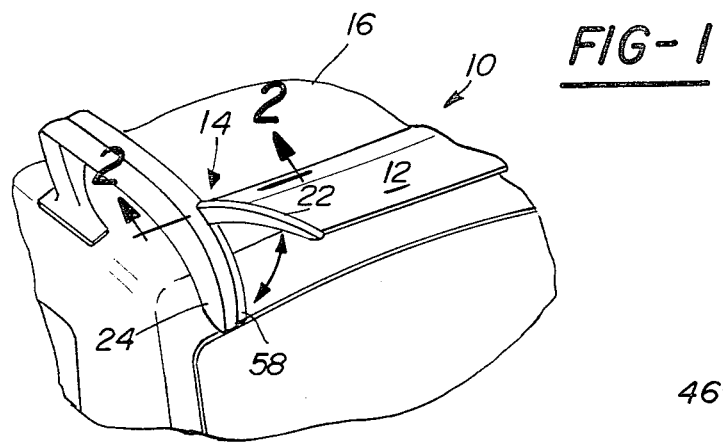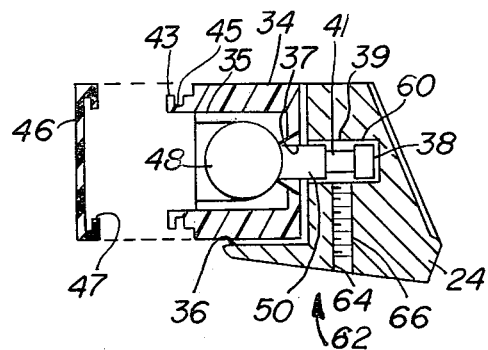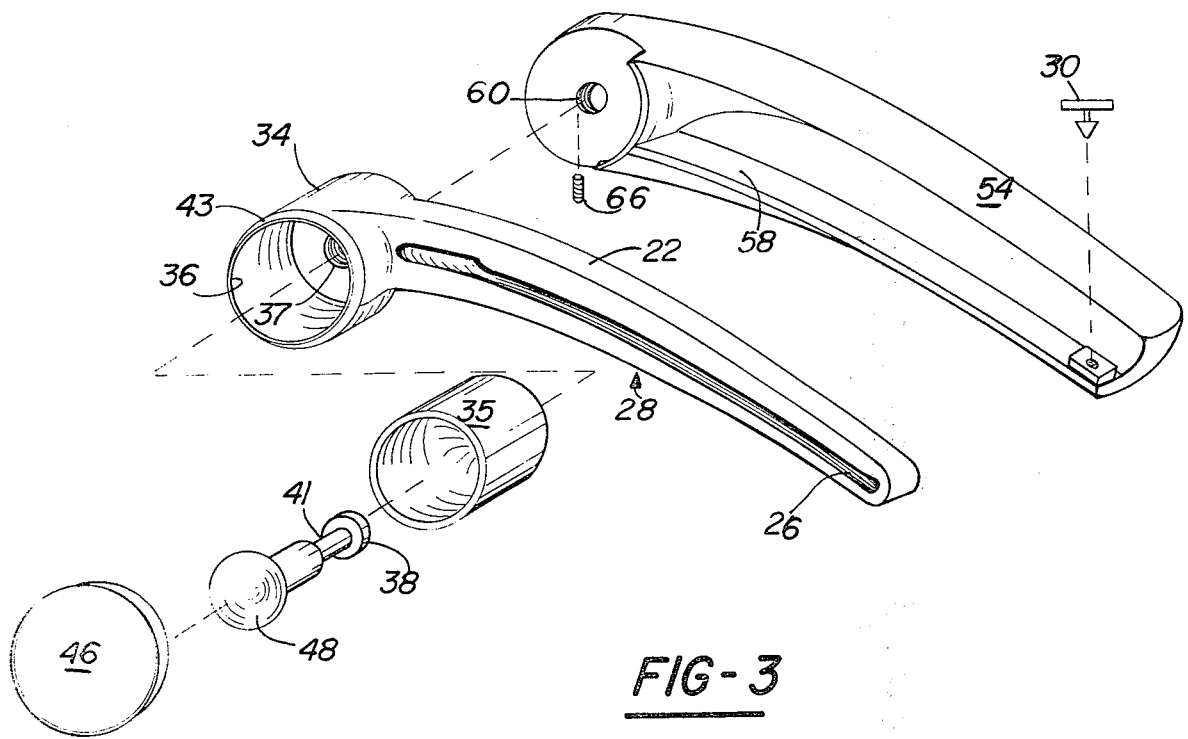

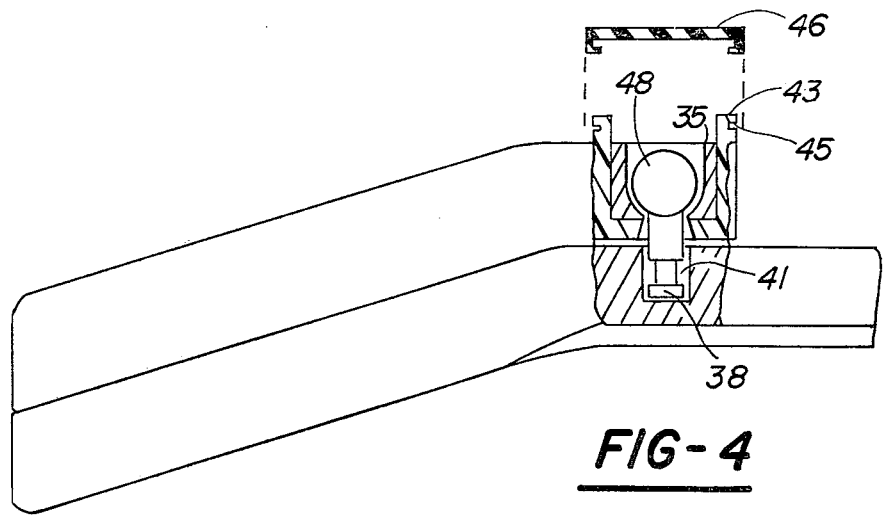
FIG-4
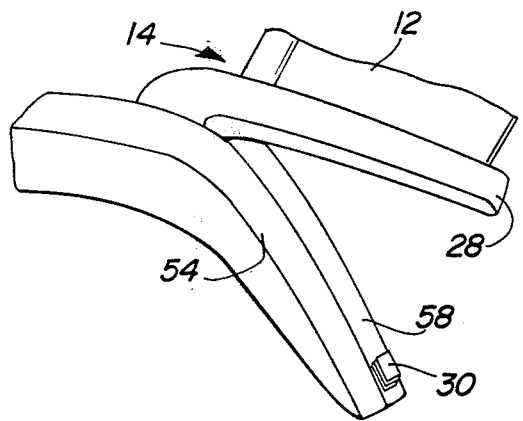
FIG-5
FIG-6
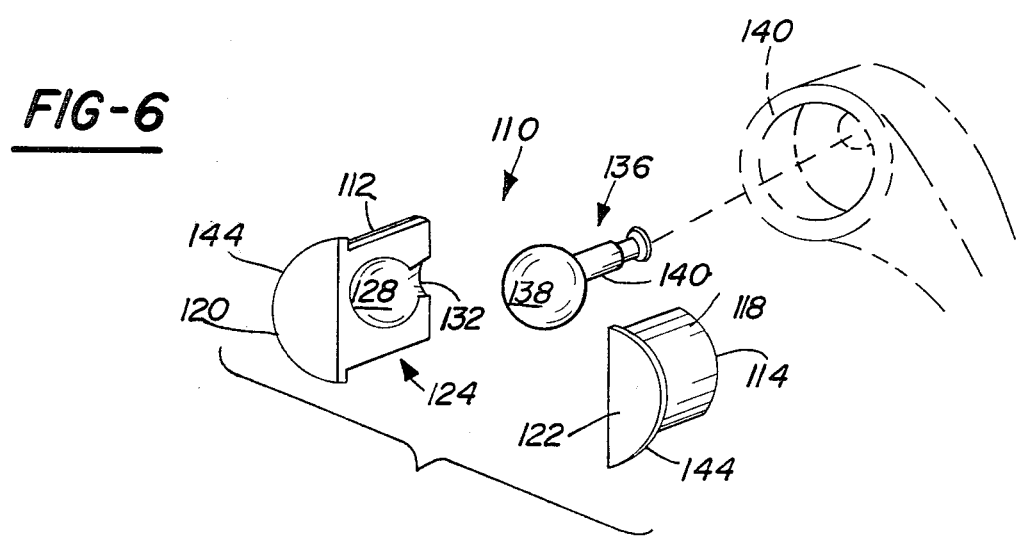

VELOCITY RESPONSIVE DEFLECTOR BLADE WITH SELF-ALIGNMENT PIVOTAL MOUNTING

CROSS REFERENCE TO RELATED APPLICATIONS

This application is a continuation in part of application Ser. No. 848,402 filed Nov. 4, 1977, U.S. Pat. No. 4,179,154 entitled "Velocity Sensitive Air Deflector" and application Ser. No. 884,009, filed Mar. 6, 1978 entitled "Velocity Responsive Deflector Blade and Pivotal Mounting Therefore" and now U.S. Pat. No. 4,170,377.

BACKGROUND OF THE INVENTION

1. Field of the Invention

The present invention pertains to air deflector blades. More particularly, the present invention pertains to vehicle mounted air deflector blades. Even more particularly, the present invention concerns movable air deflector blades having a self-aligning pivotal mounting.

2. Prior Art

In co-pending U.S. patent application Ser. No. 848,402, filed Nov. 4, 1977, U.S. Pat. No. 4,179,154 for Velocity Sensitive Air Deflector, there is disclosed therein a vehicle-related air deflector blade which is movable between a vertical and horizontal position. Furthermore, there is disclosed therewithin means for locking the deflector blade in either the horizontal or vertical position. Also, in one of the modes disclosed therewithin the air deflector blade is rendered freely rotatable.

However, it is to be perceived from a review of the disclosure that there is provided little consideration to the mode by which the blade, per se, is pivotally mounted to the end castings.

Copending U.S. patent application Ser. No. 884,009, filed Mar. 6, 1978, U.S. Pat. No. 4,170,377 provides an air deflector blade with a pivotal mounting therefor which enables the pivot to be self-aligning and compensating for tolerances as well as providing a new end casting more amenable to the rotational movement of the deflector blade in response to the wind velocity.

The present invention defines unproved means for pivoting the blade to the end castings as well as an improved deflector blade and method for its attachment to the end castings.

STATEMENT OF RELEVANT ART

To the best of applicant's knowledge, the most pertinent art is that found in the aforementioned co-pending U.S. patent application, as well as the patents recited therewithin.

SUMMARY OF THE INVENTION

In accordance with the present invention, there is provided a velocity responsive air deflector blade which rotates selectively between a vertical and horizontal position in response to the velocity of wind passing therepast. The air deflector blade is pivotally mounted to an end casting which, normally, is mounted to the rear roof section of a vehicle.

The deflector blade is a conventional deflector blade having a length substantially equal to the width of a vehicle. The ends of the deflector blade are journalled into slots formed in the mounting assembly hereof. The deflector blade has an arcuate cross section with an airfoil shape. The forward edge is thickened to offer less resistance to the air and to improve te blades resistance to bending.

The mounting assembly hereof comprises first and second members, one being relatively rotatable with respect to the other. A pivotal mounting permits the pivotal rotation of the first member with respect to the second member, the blade, per se, being mounted to the first member.

The assembly hereof further incorporates means for adjustably positioning the pivotal assembly which compensates for misalignment and the like.

For a more complete understanding of the present invention reference is made to the following detailed description and accompanying drawing. In the drawing, like reference characters refer to like parts throughout the several views in which:

BRIEF DESCRIPTION OF THE DRAWING

FIG. 1 is a broken, perspective view of a velocity responsive deflector blade and pivotal mounting therefor in accordance with the present invention;

FIG. 2 is a cross-sectional view taken along line 2—2 of FIG. 1;

FIG. 3 is an exploded view depicting the pivotal mounting hereof;

FIG. 4 is a top plan view of the pivotal mounting hereof, partly in cross section;

FIG. 5 is a broken perspective view of the pivotal mounting hereof;

FIG. 6 is an exploded, perspective view of an alternate pivotal mounting means used herein;

DESCRIPTION OF THE PREFERRED EMBODIMENT

Figure 7:
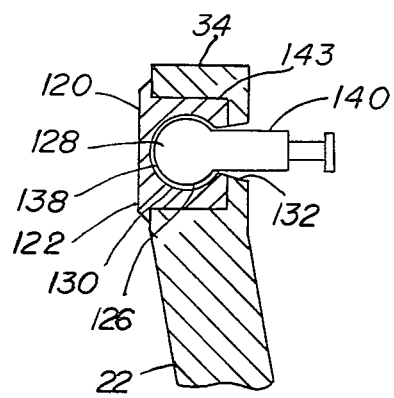
FIG. 7 is a cross-sectional view of the mounting of FIG. 6 in a deployed mode.

As shown in FIGS. 1-5, accordance with the present invention, there is provided a velocity responsive deflector blade assembly generally indicated at 10. The deflector blade assembly hereof comprises a deflector blade 12 and a mounting therefor, generally, denoted at 14.

At the outset, it is to be noted that the deflector blade 12 is normally mounted onto the roof 16 of a vehicle 18 such that when the vehicle is in motion, air currents are deflected downwardly across the back light or window 20 of the vehicle.

As is known to those skilled in the art to which the invention pertains, as the velocity or speed of the car increases the deflector blade, which is normally disposed perpendicular to the roof, creates a great drag thereby reducing gasoline mileage and the like.

In accordance with the present invention, the deflector blade hereof is rendered velocity responsive in that as the speed of the car increases thereby increasing the speed of the air flowing and impinging upon the deflector blade the velocity vectors urge the deflector blade toward a horizontal plane substantially parallel to that of the roof.

Referring again to the drawing, the deflector blade 12, as is known to those skilled in the art, traverses substantially the entire width of the vehicle. Thus, it is to be understood that such is the case herein.

The deflector blade, per se, comprises a light weight member of any suitable configuration which, by its normal weight distribution, orients angularly with respect to the horizontal or roof 16.

The ends of the blade, as above noted, are journalled onto the mounting assembly 14 hereof for pivotal rotation.

The mounting assembly 14 hereof comprises a two-member assembly of first and second members 22, 24, respectively.

The first member or blade cap 22 receives the ends of the blade 12 and is pivotally mounted to the second member or casting 24.

The blade cap is provided with a central elongated slot 26 which is journalled the end of the blade associated therewith. In this regard, it is to be noted that each end of the deflector blade is similarly mounted to a like mounting assembly. Thus, for purposes of brevity, only one such assembly is described herein.

The blade cap 22 further comprises an elongated section 28 which is substantially co-extensive with the slot 26. The section 28 is an arcuate section or portion which is designed to abut against a section of the casting or second member 24. When there is insufficient speed of the car to deflect the blade 12, the blade cap 22 rests against a cushioning member 30. The cushioning member 30 has a square upper wall with a planar surface. A lower wall is substantially parallel to the upper wall and has a narrow neck projecting downward from its center. The narrow neck enlarges at its lower end to form a collar of increased diameter. The collar moves downward and inward to form a point at which the cushioning member ends. The second member 24 has a depression in its lower surface to receive the upper surfaces of the cushioning member 30. An aperture through the center of the depression is configured to subtly receive the neck of the cushioning member. When the collar of the cushioning member is forced through the aperture the collar expands as it clears the aperture and retains the cushioning member 30 in the depression. The cushioning member 30 absorbs the vibratory impulses transmitted to the blade cap upon impact between the casting and the blade cap as the blade cap rotates responsively to the velocity of the air flowing therepast. The cushioning means 30 is formed from any suitable material, such as a hard rubber, sponge or other suitable natural or synthetic resilient material.

The section 28 extends into an enlarged portion or body 34. The body 34 is provided with a transverse opening or bore 36. A hollow cup 35 is insertable into the bore 36 which slidingly receives the outside diameter of the cup 35. The interior of the cup 35 has at its bottom a concave hemispherical shape configured to receive the spherical enlarged head 48 of a pivot pin 38. A through bore 37 at the bottom of the cup 36 is aligned with a bore 60 in the member 24. The pivot pin 38 has a shank diameter 39 which slidingly passes through the apertures 37 and 39 to pivotally join the deflector blade to the body.

A circular boss 43 projects above the surface of the end cap 22 surrounding the bore 36. A circular recess 45 is provided around the periphery of the boss 43. An end cap 46 is configured to press over the raise boss 43 and has an inward projecting lip around its inner periphery 47 to engage the peripheral recess 45 and hold the end cap 46 firmly in place.

The pivot pin 38 comprises a metallic member or the like having an enlarged spherical head 48 which seats in the cup 35. The pivotal means defines a self-aligning assembly by virtue of the orb-configuration of the head 48, which cooperates with the cup 35 to overcome angularity, misalignments and the like such that the blade always correctly orientates and freely rotates.

The end casting or member 24, as is known to those skilled in the art, may comprise the terminal end of a cross rail or side rail ordinarily associated with a luggage rack or the like. The castings may be fixedly mounted to the side rail or roof of the vehicle via any suitable mode. The exact form of mounting and association of the casting with the cross rail or side rail does not form part of the present invention, per se.

As shown in the drawing, the casting 24 comprises a main body portion 52 having a first leg 54 and a second leg 56. The legs 54 and 56 are angularly inclined with respect to one another. The casting is, however, an integral and unitary structure.

Extending laterally inwardly from the first leg 54 is a ledge or seat 58. The ledge 58 is formed integrally with the first leg of the casting and defines a seat for the blade cap 22. Thus, it is to be appreciated, in this regard that when the cushioning means 30 abuts against the casting, it is abutting against the ledge 58.

Formed in the second leg of the casting is a partial bore 60. The bore 60 is adapted to be in registry with the bore 36 and, thus, the cup 35. The pivot pin 38 extends into and seats within the bore 60, as shown. Thus, the pivot pin defines a means for pivotally interconnecting the blade cap and the end casting.

The shank or shaft portion of the pin is locked in the bore 60 in fixed position via locking means generally denoted at 62.

An upwardly extending opening 64 is formed in the second leg 56 of the casting and extends upwardly therefrom into registry with the bore 60. A fastening means 66, such as a threaded set screw or the like, is threadably inserted into the opening 64 and is threadably rotated therewithin until it encounters and meets the shank 50 of the pin 38. Continued further rotation of the fastening means 66 fixes the shank and, thus, the pin 38 in position.

In accordance with the present invention, it is to be appreciated that misalignment and tolerances can be taken up through the fastening means 66 by loosening same and permitting lateral movement of the pivot pin within the bore 60. This compensates for any misalignment and tolerance variations.

It is to be further appreciated that fixing the shaft within the bore the end cap is then free to rotate about the enlarged portion of the pin 38.

Hence, as the velocity of the air flowing past the deflector blade increases to a certain minimum whereby the downward vector of the mass of the bade is overcome, the blade will rotate about the pivot pin and tend to a horizontal plane, as shown in FIG. 1. When the velocity of the air flowing past the blade decreases, the blade will rotate downwardly. In order to avoid cracking and other deleterious effects, the cushioning means absorbs the forces of impact upon the blade cap encountering the ledge 58.

Referring, now, to FIGS. 6 and 7 there is depicted therein an alternate pivotal mounting means 110. The pivotal mounting means 110 comprises a pair of analogously configured opposed members 112, 114 respectively. Each member 112 or 114 comprises a substantially semicylindrical body 116, 118, respectively, and an enlarged semi-circular lip 120, 122, respectively, integrally formed therewith.

Each member is provided with a recess cavity 124, 126 formed in the respective body. Each cavity is configured to have an enlarged recess 128, 130, respectively, which communicates with a slotted way 132, 134, respectively.

The two members all adapted to matingly abut in apposed relationship such that a substantially cylindrical housing 141 is formed thereby having a race or recess defined therewithin by the registration of the cavities.

A pivot pin 136 has an enlarged head 138 which seats in the enlarged volume defined by recesses 128 and 130. A shaft 140 integral with the head 138 extends and projects through the guideway defined by slotted ways 132 and 134, as shown.

In deploying this embodiment of the invention the enlarged bore 143 which registers with a reduced diameter bore 142. The interface between the bores defines an annular shoulder or stop 144 for limiting the insertion of the housing 141. With the pivot pin emplaced in the race the housing is disposed within the bore 140. The undersurface of the lips 120, 122 engage the exterior wall of the enlarged body 34 to substitute for the previously referred to cap 46. Thus, this embodiment of the invention is defined by a pivot pin and a race therefor formed within a removable and separable housing.

Figure 8:
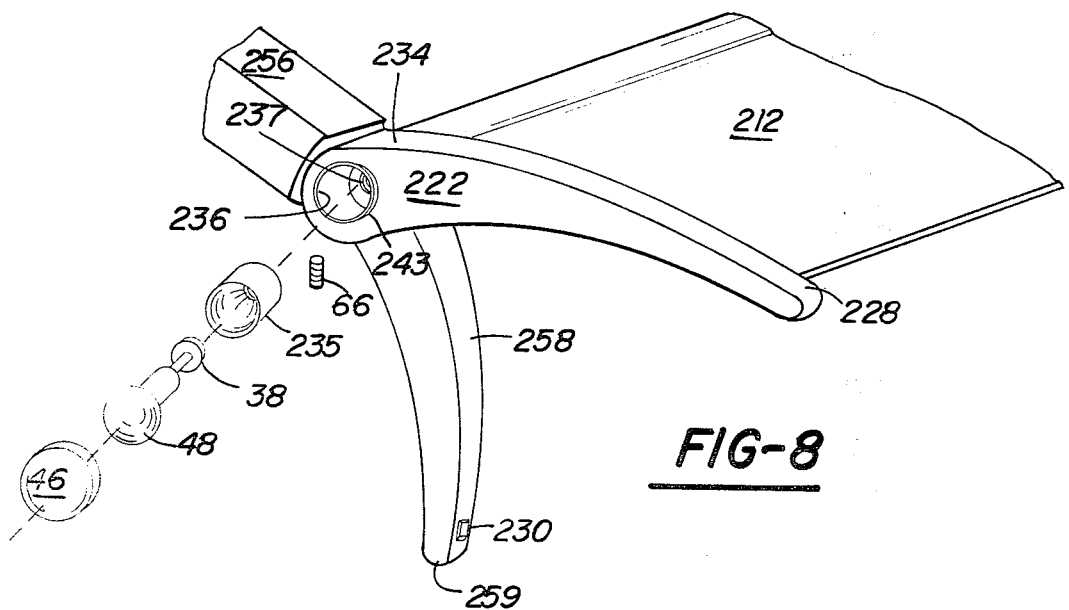
FIG. 8 is a perspective view of another embodiment of the present invention.

Referring again to the drawing and in particular to FIG. 8 wherein there is illustrated another embodiment of the present invention. A deflector blade 212 is secured at either end by a pair of end caps 222. The function of each end cap 222 is identical and for simplicity the function of only one end cap 222 will be described herein below. The end cap 222 has an enlarged end 234 and a tapered end 228. The enlarged end 234 has a boss 243 projecting a distance above its surface. The boss 243 has at its center a bore 236 which is configured to slidingly receive the outside diameter of a cup 235. The cup 235 has at its center a concave spherical cup configured to seat the enlarged end 48 of the pivot pin 38. A through bore 237 at the bottom of the bore 236 is configured to slidingly receive the shank diameter of the pin 38. The pin 38 is supported by a casting member 258 which is fixedly attached to the roof of the vehicle. The through bore 237 aligns with a bore in the casting 258 to receive the pin 38 and the pin 38 is secured to the casting 258 by a set screw 66 which is threadingly received by a cross aperture within the casting 258 which intersects the aperture aligned with the aperture 237. The cap 46 is configured to snap over the boss 243 enclosing the aperture 236 and completing the pivot pin assembly and pivotally attach the end cap 222 to the casting 258.

The casting 258 has a lower arm 259 and an upper arm 256. The upper arm 256 is an extention of the upper strap of a luggage bracket or the like. The lower arm 259 curves downward in an arcuate member extending at its lower end at right angles to the upper arm 256. The lower arm 259 serves as a resting place for the blade 212 when there is insufficient vehicle velocity to raise the blade 212 upward toward its horizontal position. The lower arm 259 has a recess at its lower end to receive a cushioning member 230 which is nestingly received within the recess and projects thereabove a distance to provide a surface against which the blade 212 can impact when coming to rest in its vertical position. The center of the recess has an aperture therethrough to receive an extending portion of the cushioning member 230 which projects from the center inside portion of the cushioning member. The neck after passing through the aperture expands into a collar to hold the cushioning device 230 firmly in place. The collar tapers from its outer periphery to a point at its end, the point serving as a means to aid with the insertion of the collar into the aperture for assembly of the cushioning member to the arm 259.

Figure 9:
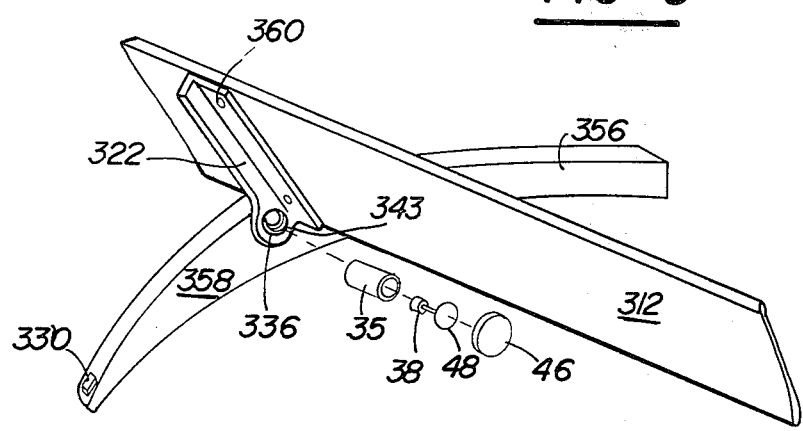
FIG. 9 is a perspective view of an alternate embodiment of the present invention employing an alternate blade attachment means.

Referring again to the drawing and in particular to FIG. 9 wherein there is illustrated yet another embodiment of the present invention. A pivoting air deflector blade 312 is pivotally supported by a pair of end caps 322. The end caps 322 are supported by a pair of spaced apart castings 358 which are an extension of the upper portion of a vehicle luggage rack and attached to the luggage rack by a horizontal extension 356. A bore 336 in the end cap 322 slidingly receives a cup 35 which has a concave spherical seat at its bottom. A through bore in the cup at its bottom receives the end of the pivot pin 38. The enlarged end 48 of the pivot pin is spherical in configuration and conforms to the spherical pocket in the cup 35. The end of the pin 38 is slidingly received by an aperture in the casting 358 and is secured therein by a cross threaded aperture which receives a threaded set screw to secure the pivot pin 38 securely in place. The pivot pin assembly is covered by a cap 46 which snaps over a boss 343 projecting above the surface of the end cap 322. The pivoting assembly allows the blade 312 to pivot with respect to the casting 358. When there is insufficient vehicle speed to deflect the blade 312 upward it rests upon lower leg 359 of the casting 358. A recess in the lower end of the lower casting 359 receives a cushioning member 330 which rests within the recess and projects a slight amount thereabove. An aperture in the center of the recess projects through the casting lower end 359 to receive a narrow neck of the cushioning member 330 which projects through the aperture and has at its end an expanded collar to secure the cushioning member 330 to the lower end of the casting 359. The collar tapers to a point at its end to aid in its insertion into the aperture at the bottom of the recess. The cushioning member 330 serves as a means for absorbing the impact of the blade 312 when it comes to rest against the lower leg 359 of the casting 358.

The end cap 322 widens along its upper surface to provide an airfoil surface which curves in an arcuate manner as it traverses from front to rear. The arcuate matches the curvature of the underside of the blade 312. A pair of apertures 360 in the end cap 322 align with a pair of apertures in the blade 312 to receive a pair of fasteners such as rivets or the like to secure the blade 312 to the pivoted end cap 322. The blade 312 projects transversely beyond the end cap 322 providing a wider surface to deflect air downward across the rear light of the automobile. The end cap 322 can also be affixed to the blade 312 by adhesive bonding or the like.

Figure 10:
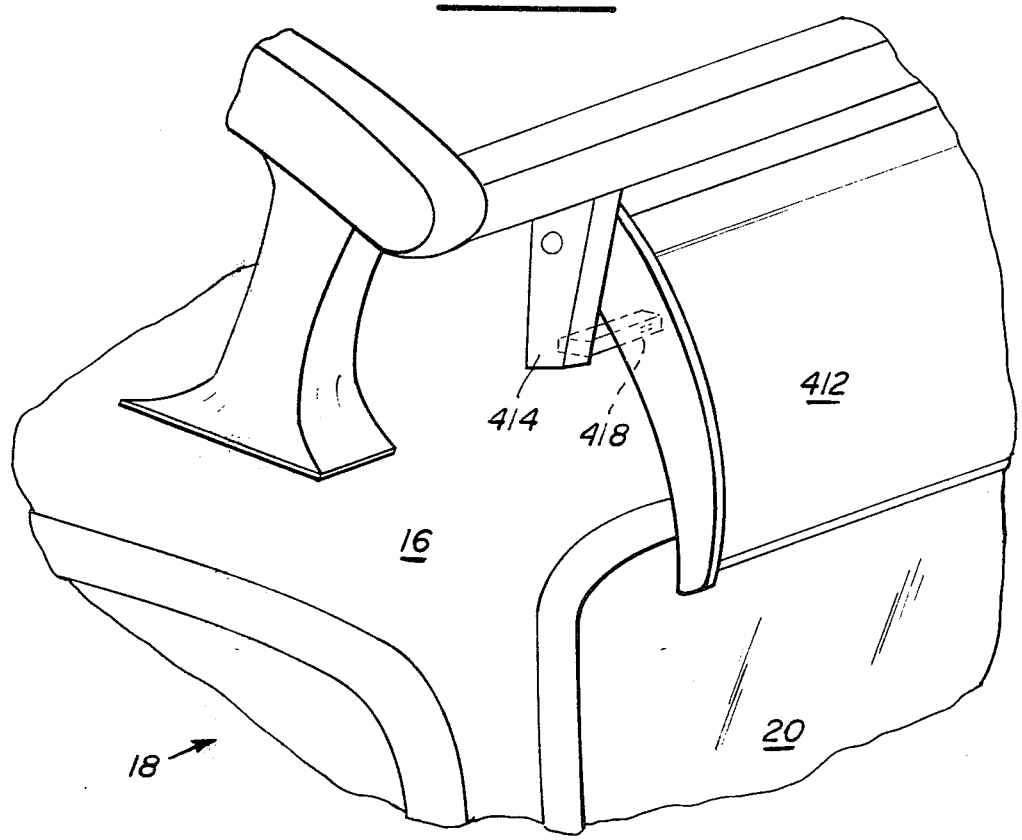
FIG. 10 is a perspective view of an embodiment of the present invention employing a blade hinged to a luggage rack cross strap.

FIG. 10 illustrates an additional embodiment of the present invention wherein the blade is hinged from the cross strap of a luggage bracket. A lower edge of the blade 412 rests upon a projection 418 of the support 414 when the vehicle is at rest or there is insufficient velocity of the vehicle to raise the blade 412 from its at rest position.

Figure 11:
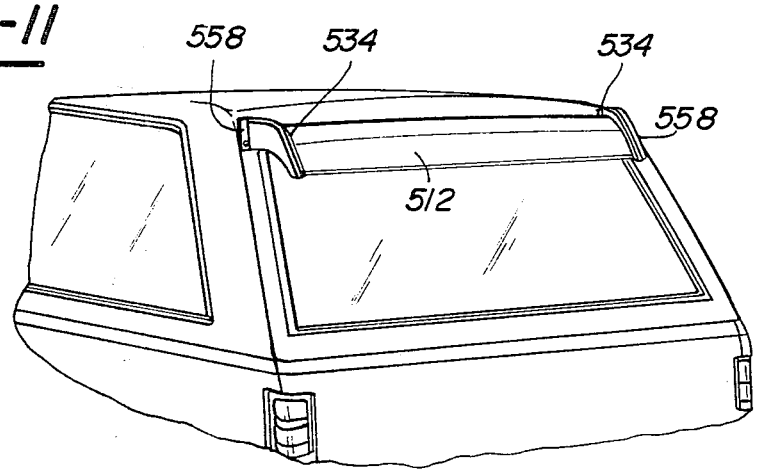
FIG. 11 is a perspective view of an embodiment of the present invention wherein the pivoting blade assembly is mounted to the rear light frame.

Referring, now to FIG. 11 wherein there is illustrated an embodiment of the present invention with the pivoting blade assembly mounted to the frame of the rear light or alternatively mounted to the vehicle body adjacent the rear light. A pair of castings 558 are fastened to the vehicle frame or the frame of the rear light. A pair of end caps are hingedly attached to the castings 558 and support therebetween a deflector blade 512.

It is to be appreciated from the preceding that there has been described herein a velocity responsive deflector blade to be freely and selectively rotatable between a vertical and horizontal position in response to the velocity of the flowing therepast.

Having, thus, described the invention what is claimed is:

1. A velocity responsive deflector blade assembly comprising:
   (a) a deflector blade,
   (b) a mounting assembly for each end of the blade, each assembly comprising:
     (1) a blade cap, the end of the deflector blade being journalled thereonto, said blade cap having a slot formed therein, the end of the blade being journalled into the slot and frictionally retained therewithin;
     (2) a casting having means defining a ledge, the blade cap normally seating on the ledge; and
     (3) means for self aligningly and pivotally mounting the blade cap to the casting, and
   wherein the blade cap pivotally rotates about the pivotal mounting means relative to the casting in response to the velocity of air impinging against the deflector blade.

2. The assembly of claim 1 which further comprises: cushioning means carried on the blade cap for softening impacts between the blade cap and the ledge.

3. The assembly of claim 1 wherein:
   (a) the blade cap has a throughbore formed therein,
   (b) the casting has a partial bore formed therein, which is in registry with the blade cap throughbore,
   the assembly further comprising: a pivot pin extending between the bores and disposed therewithin and defining the pivotal mounting means.

4. The assembly of claim 3 wherein:
   the blade cap throughbore has a spherical race formed therewithin, and
   the pivot pin has an enlarged spherical head which seats within the race.

5. A mounting assembly for a velocity responsive deflector blade, comprising:
   (a) a blade cap adapted to receive an end of a deflector blade,
   (b) a casting having means defining a ledge formed therewith,
   (c) means pivotally mounting the blade cap to the casting,
   (d) cushioning means carried on the blade cap for softening impact between the blade cap and the ledge and
   wherein the blade cap pivotally rotates about the pivotal mounting means relative to the casting in a self aligning manner.

6. The assembly of claim 5 wherein:
   (a) the blade cap has a throughbore formed therein,
   (b) the casting has a partial bore formed therein which is in registry with the blade cap throughbore,
   the assembly further comprising: a pivot pin extending between the bores and disposed therewithin, the pin having an enlarged spherical head defining the self aligning pivotal mounting means.

7. The assembly of claim 6 wherein:
   the blade cap throughbore has a race formed therewithin, and
   the pivot pin has an enlarged spherical head which seats within the spherical recess of race to form a self aligning pivot.

* * * * *